United States Patent [19]

Granata, Jr. et al.

[11] Patent Number: 5,096,786
[45] Date of Patent: Mar. 17, 1992

[54] INTEGRAL EDGE SEALS FOR PHOSPHORIC ACID FUEL CELLS

[75] Inventors: Samuel J. Granata, Jr., South Greensburg; Boyd M. Woodle, North Huntingdon Township, Westmoreland County, both of Pa.; Thomas J. Dunyak, Blacksburg, Va.

[73] Assignee: Westinghouse Electric Corp., Pittsburgh, Pa.

[21] Appl. No.: 405,717

[22] Filed: Sep. 11, 1989

[51] Int. Cl.$^5$ ............................................. H01M 2/08
[52] U.S. Cl. ........................................ 429/35; 429/36
[58] Field of Search ...................................... 429/34–39, 429/185, 46

[56] References Cited

U.S. PATENT DOCUMENTS

| | | | |
|---|---|---|---|
| 3,389,017 | 6/1968 | Webb | 429/36 |
| 3,846,176 | 11/1974 | Kuhl | 429/36 |
| 3,867,206 | 2/1975 | Trocciola et al. | 429/35 |
| 4,259,389 | 3/1981 | Vine et al. | 429/36 X |
| 4,579,788 | 4/1986 | Marianowski et al. | 429/34 X |

Primary Examiner—Anthony Skapars
Attorney, Agent, or Firm—Fred J. Baehr, Jr.

[57] ABSTRACT

A phosphoric acid fuel cell having integral edge seals formed by an elastomer permeating an outer peripheral band contiguous with the outer peripheral edges of the cathode and anode assemblies and the matrix to form an integral edge seal which is reliable, easy to manufacture and has creep characteristics similar to the anode, cathode and matrix assemblies inboard of the seals to assure good electrical contact throughout the life of the fuel cell.

21 Claims, 3 Drawing Sheets

INTEGRAL EDGE SEALS FOR PHOSPHORIC ACID FUEL CELLS

GOVERNMENT CONTRACT

This invention was conceived or first reduced to practice in the course of, or under contract number NASA-DEN3-290 between Westinghouse Electric Corporation and the United Stated Government, represented by the Department of Energy.

CROSS REFERENCE TO RELATED APPLICATIONS

This application is related to a co-pending applications entitled Compliant Overlapped Dry Seal for Phosphoric Acid Fuel Cell, Ser. No. 405,716 and Corrosion Free Phosphoric Acid Fuel Cell, Ser. No. 405,718 both assigned to the same assignee and filed concurrently herewith.

BACKGROUND OF THE INVENTION

The invention relates to a phosphoric acid fuel cell and more particularly to integral edge seals for a phosphoric acid fuel cell.

Phosphoric acid fuel cells provide an environment for an electrochemical reaction between a fuel and oxidant to create electrical energy. The fuel cells may be any shape. However, they are normally rectangular and stacked one on top of another. A stack of fuel cells, so formed, have manifolds disposed on opposite sides of the stack for supplying fuel and oxygen to the cells and for removing spent gases from the cells. The cells are disposed between bipolar plates made of graphite with a plurality of grooves on opposite sides thereof to either supply fuel, such as hydrogen, to the anode and oxidant, such as oxygen in the form of air, to the cathode. The anode assembly is formed by providing a layer of catalyst on a graphite backing. The cathode is also formed by providing a catalytic layer on graphite backing paper. Between the catalytic layers of the anode and the catalytic layer of the cathode is a porous matrix and an insulator such as a silicon carbide layer. The silicon carbide is disposed adjacent the cathode or anode and acts as an electron insulator to prevent electrons from traveling within the cell from the anode assembly to the cathode assembly. The catalytic layer of the anode assembly, the catalytic layer of the cathode assembly, the silicon carbide layer and the matrix are sufficiently porous to allow the electrolyte, phosphoric acid, to permeate therethrough. The catalyst in combination with the high temperature of the anode gases causes the hydrogen to ionize. The hydrogen ions conduct through the electrolyte to react with the oxygen in the catalytic layer of the cathode. The electrons freed when creating the hydrogen ions flow through the conductive bipolar plate to the cathode in the adjacent cell to form an electrical potential.

U.S. Pat. No. 3,867,206 describes wet seals for fuel cells wherein the edges of the electrodes are impregnated with particular material to reduce the pore size adjacent the edges so that when permeated with electrolyte a seal is formed due to the capillary action of the reduced pore size.

U.S. Pat. No. 3,846,176 describes encasing the fuel cell in molded plastic.

SUMMARY OF THE INVENTION

Among the objects of the invention may be noted the provision of an integral edge seal which is easy to fabricate, forms a gas tight seal, provides aligned edges to facilitate manifold sealing along the faces of the stack of cells and distributes the compressive forces applied to a stack of cells between the sealing edges and the fuel cell to maintain good electrical contact between the cell elements throughout the life of the fuel cell.

In general, an integral edge seal for a phosphoric acid fuel cell having an anode assembly, a matrix assembly and a cathode assembly disposed between a pair of bipolar plates, which have grooves for supplying fuel gas and oxygen to the anode and cathode assemblies and an electrolyte which diffuses through portions of the anode, matrix and cathode assemblies, when made in accordance with this invention, comprises an elastomer permeating a band of the anode, cathode and matrix assemblies generally contiguous with the peripheral edges thereof to prevent electrolyte and gases from entering the peripheral edge bands of the anode, cathode and matrix assemblies and to allow the peripheral edge bands to be compressed to form a reliable edge seal which is easy to fabricate and to provide creep characteristics in the peripheral edge bands which approach the creep characteristics of portions of the anode and cathode assemblies inboard of the peripheral edge bands to maintain good electrical contact between the bipolar plates, the anode assemblies, the matrix assemblies and the cathode assemblies during the entire life of the fuel cell.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

DESCRIPTION OF THE PREFERRED EMBODIMENT

Figure 1:
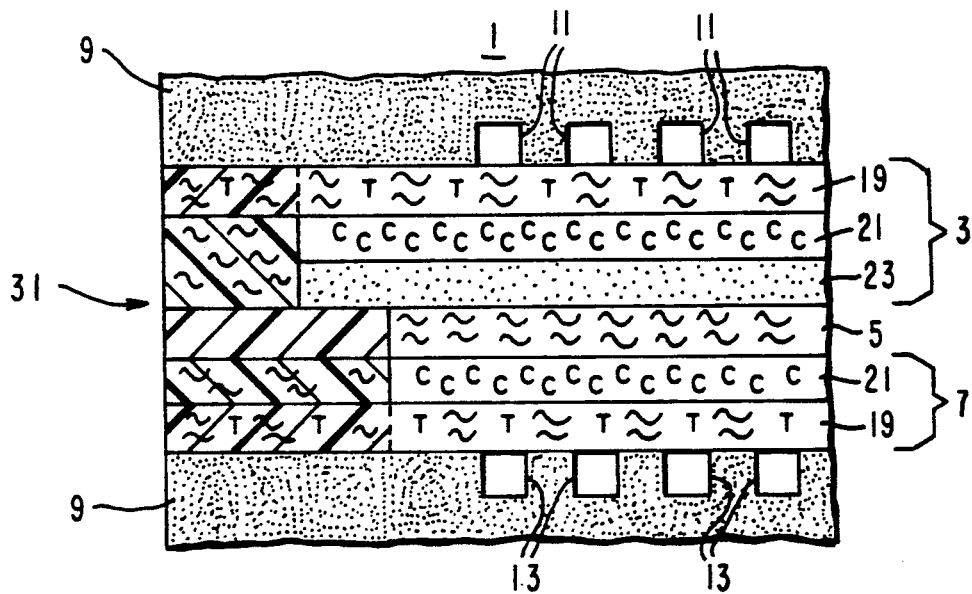
FIG. 1 is a partial sectional view of a portion of an integral edge seal through the acid makeup edge of a fuel cell made in accordance with this invention.
Figure 2:
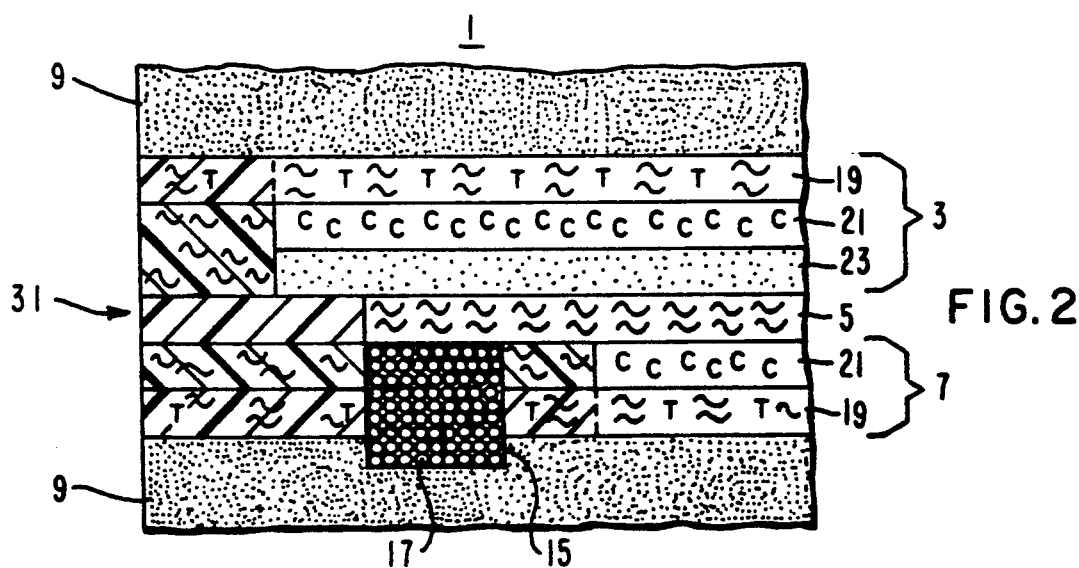
FIG. 2 is a partial sectional view of a portion of an integral edge seal in the vicinity of the acid groove.

Referring now to the drawings in detail and in particular to FIGS. 1 and 2 there is shown a portion of a fuel cell 1 comprising an anode assembly 3, a carbon layer or matrix 5 and a cathode assembly 7 disposed between a pair of bipolar or other conductive plates 9. The bipolar plates 9 have a plurality of grooves 11 and 13 for, respectively, supplying fuel gas, to the anode assembly 3 and air to the cathode assembly 7. As shown in FIG. 2, the bipolar plates 9 also have an electrolyte or phosphoric acid groove 15 with a wick 17 disposed therein for supplying electrolyte to a portion of the anode assembly 3, the matrix 5 and a portion of the cathode assembly 7.

The anode and cathode assemblies are made up of a graphite backing paper 19 treated with teflon or other liquid repelling material to make it wet proof or hydrophobic to the electrolyte, but allow gasses to easily pass therethrough. Overlaying the backing paper 19 is a layer of catalytic material 21. A layer of silicon carbide 23 is disposed between the matrix 5 and the anode or cathode catalytic layers 21 to act as an electron insulator which prevents the flow of electrons between the anode and cathode assemblies 3 and 7 within the fuel cell 1. The matrix 5, is a hydrophilic material which when filled with electrolyte, forms a gas barrier and prevents the fuel gas and air from mixing within the cell 1.

Integral edge seals, generally indicated at 31, are formed by impregnating the peripheral edges of the layers with an elastomer such as Aflas. Aflas is a copolymer of tetrafluoroethylene and propylene. The elastomer is impregnated into peripheral bands of the layers by a hot compression technique, a soak technique, or an autoclave technique. The elastomer permeates and fills the pores of the layer of material thus forming a band impermeable to liquid or gas. The impregnated bands have compression characteristics which approach those of the contiguous material so that the components of the fuel cell will maintain sufficient electrical contact throughout the life of the fuel cell. The integral edge seals 31 can be formed of various portions and assembled in numerous configurations. Some of these various portions and preferred configurations are described in detail and shown in the drawings.

Figure 3:
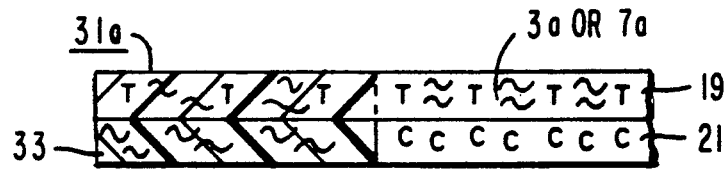
FIG. 3 is a partial sectional view of a portion of an integral edge seal for an anode or cathode assembly.

FIG. 3 shows an anode or cathode assembly 3a or 7a, wherein the backing paper 19 has a band, contiguous with the peripheral edges thereof, impregnated with the elastomer to form a portion of the integral edge seal 31a. Overlaying the backing paper 19 is a layer of catalytic material 21. The catalytic material 21 is smaller than the backing paper 19 so that when laminated on the backing paper 19 there is a band or border encircling the catalytic material 21 where the backing paper 19 extends beyond the catalytic material 21. A filler made of backing paper or other material 33 having generally the same thickness as the catalytic material 21 and same width as the border is disposed generally contiguous with the outer peripheral edges of the catalytic layer 21 and is impregnated with elastomer and bonded to the elastomer impregnated band of the backing paper 19 to form another of the integral edge seal 31a.

Figure 4:
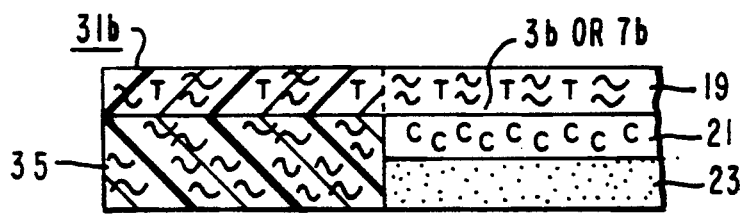
FIG. 4 is a partial sectional view of a portion of an integral edge seal for an anode or cathode assembly containing a silicon carbide layer.

FIG. 4 shows an anode or cathode assembly 3b or 7b, which like the anode and cathode 3a and 7a, has the backing paper 19 with an integral elastomer impregnated band and the catalytic layer 21 overlaying the backing paper 19. However, it also includes a layer of silicon carbide 23, which is essentially the same size as the catalytic layer 21 and overlays that layer. A band of filler or backing paper or other material 35 is disposed generally contiguous with the outer periphery edges of the silicon carbide layer 23 and the catalytic layer 21, encircles these layers, is permeated with an elastomer, and is bonded to the other seal portions to form an integral edge seal portion 31b.

Figure 5:
FIG. 5 is a partial sectional view of a portion of an integral edge seal for an alternative anode or cathode assembly.

As shown in FIG. 5, the backing paper 19 and catalytic layer 21 can be both made the same size, and bands generally having the same width contiguous with the outer peripheral edges thereof are impregnated with an elastomer to form an integral edge seals 31c.

Figure 6:
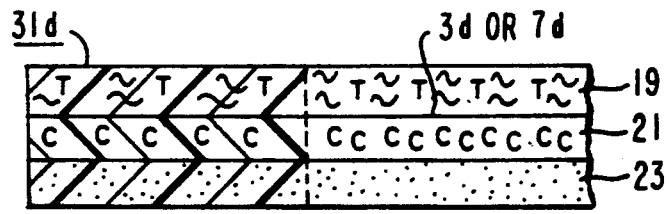
FIG. 6 is a partial sectional view of a portion of an integral edge seal for an alternative anode or cathode assembly.

An integral edge seal 31d, shown in FIG. 6, comprises an anode or cathode assembly 3d or 7d, wherein the backing paper 19, catalytic layer 21 and silicon layer 23 are all the same size, and bands generally of equal width are disposed contiguous with the outer peripheral edges of each. Each peripheral band is impregnated with an elastomer. The backing paper 19, catalytic layer 21, silicon carbide layer 23, and bands impregnated with elastomer are all bonded together to form an integral electrode.

Figure 7:
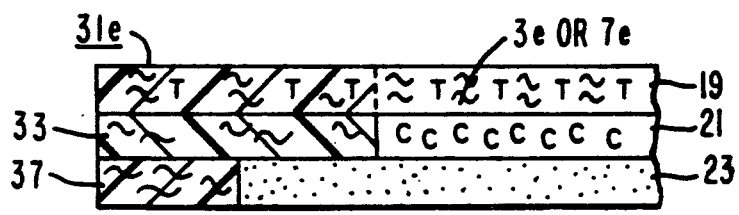
FIG. 7 is a partial sectional view of a portion of an integral edge seal for an alternative anode or cathode assembly with a silicon carbide layer.
Figure 9:
FIG. 9 is a partial sectional view of a portion of a matrix with a Teflon seal.
Figure 10:
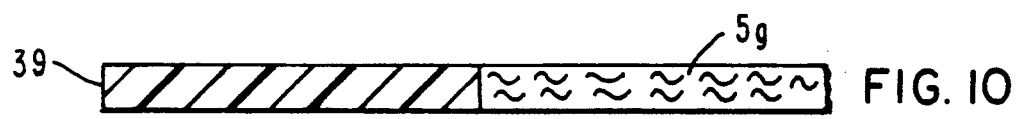
FIG. 10 is a partial sectional view of a portion of an alternative matrix with a Teflon seal.

FIG. 7 shows an alternate integral edge seal 31e, where the backing paper 19 has a band contiguous with its outer peripheral edges impregnated with elastomer. The catalytic layer 21 is smaller than the backing paper layer. A band is formed of filler paper of other material 33 such that the band is contiguous with the outer peripheral edges of the catalytic layer. The band is impregnated with the elastomer and bonded to the backing paper band. The silicon carbide layer 23 is larger than the catalytic layer 21 and smaller than the backing paper 19. A band of filler paper 37 generally having a thickness equal to the thickness of the silicon carbide layer 23 and an outer periphery, which registers with the outer periphery of the backing paper 19 is impregnated with elastomer and is disposed contiguous with the outer peripheral edge of the silicon carbide layer 23 to form a portion of an integral edge seal 31e. This arrangement can be utilized with a plain matrix to form a wet seal or with a matrix 5f and 5g, shown respectively in FIGS. 9 and 10. The matrices 5f and 5g each have a band of Teflon or other material 38 and 39, respectively, disposed contiguous with its outer peripheral edges to form a dry seal. The Teflon ban 39 as shown in FIGS. 10 is substantially wider than the Teflon ban 38 shown in FIG. 9.

Figure 8:
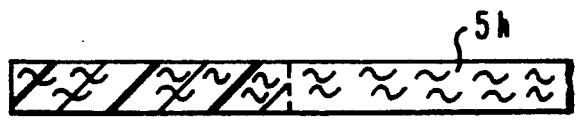
FIG. 8 is a partial sectional view of a portion of an integral edge seal for a matrix.
Figure 11:
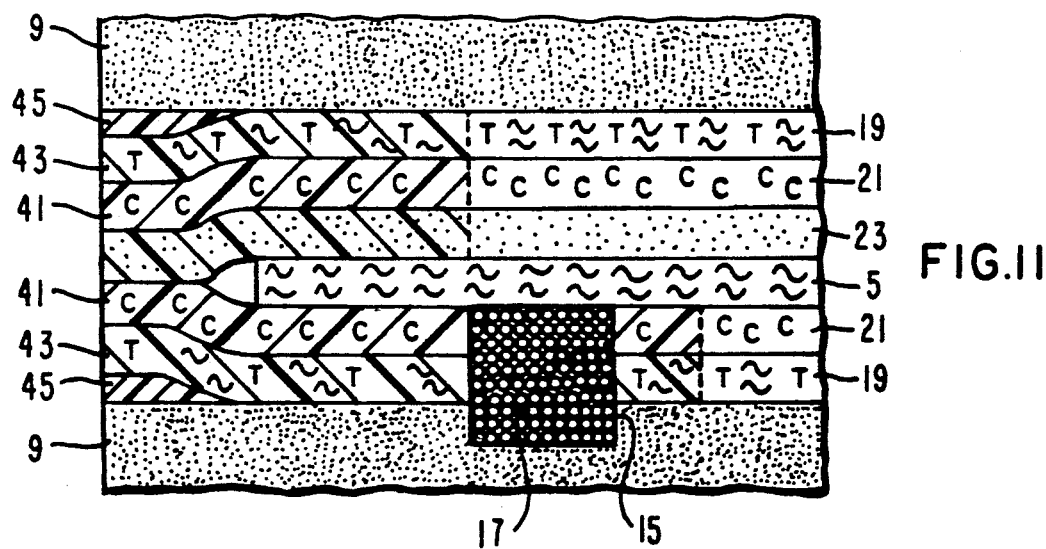
FIG. 11 is a partial sectional view of a portion of an alternative integral edge seal in the vicinity of the acid groove.

A matrix 5h, shown in FIG. 8, has its outer peripheral edges impregnated with elastomer and is utilized to form a portion the integral edge seal for the fuel cell 1. FIG. 11 shows an alternative integral edge seal in the vicinity of the acid groove wherein the anode and cathode assemblies comprise backing paper 19 overlaid with a layer of the catalytic material 21 of the same size and either the cathode or anode assembly also has a layer of the silicon carbide material 23 overlaying the catalytic material 21. The peripheral edges thereof are impregnated with an elastomer such as Aflas to form a gas and electrolyte sealing band 41 and 43 contiguous with the peripheral edges. The matrix 5 with smaller peripheral edges, which are not impregnated with an elastomer, is sandwiched between the anode and cathode assemblies along with the silicon carbide layer in such a manner that the impregnated edges abut and extend beyond the edge of the matrix forming an electrolyte and gas tight integral edge seal and a wet or gas seal between the anode and cathode. Slight depressions are formed adjacent the peripheral edges or margins due to the smaller matrix 5. The depressions are filled with an elastomer such as Aflas 45 to complete the integral edge seal and present a smooth filled exterior surfaces between the bipolar plates 9.

Various combinations and arrangements of anode assemblies, cathode assemblies, matrices and silicon carbide layers other than those shown in FIGS. 1 and 2 may be utilized to form reliable edge seals which are easy to fabricate, distribute the compressive load between the seal portion and the cell portion to maintain good electrical contact between the cell components throughout the life of the fuel cell. While only one edge of the integral edge seal is shown in FIGS. 3 through 10, it is understood that each integral seal has two pair of edges, one pair similar to the arrangement shown in FIGS. 1 and another pair similar to the arrangement shown in FIG. 2.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. An integral edge seal for a phosphoric acid fuel cell having an anode assembly, a matrix assembly and a cathode assembly disposed between a pair of conductive plates which have grooves for supplying fuel gas and oxygen to the anode and cathode assemblies wherein an electrolyte diffuses through a portion of the anode, matrix and cathode assemblies, said integral edge seal comprising an elastomer disposed to generally permeate a band encircling the anode, cathode and matrix assemblies and generally contiguous with the peripheral edges thereof to prevent gases and electrolyte from entering the peripheral edge bands of the anode and cathode assemblies and to allow the peripheral edge bands to be compressed to form a reliable seal which is easy to fabricate and to provide creep characteristics in the elastomer permeated peripheral edge bands which approach the creep characteristics of portions of the anode and cathode assemblies inboard of the peripheral edge bands to maintain good electrical contact between the conductive plates, the anode assemblies, the matrix assemblies and the cathode assemblies over the life of the fuel cell.

2. An integral edge seal as set forth in claim 1, wherein the anode and cathode assemblies each comprises a sheet of backing paper having a band of the backing paper generally contiguous with the peripheral edges thereof permeated with an elastomer to form a portion of the integral edge seal.

3. An integral edge seal as set forth in claim 2, wherein the anode and cathode assemblies each comprises a layer of catalytic material overlaying the backing paper and having a band of non-catalytic material forming its peripheral edges and these bands of non-catalytic material are permeated with an elastomer to form portions of the integral edge seal.

4. An integral edge seal as set forth in claim 2, wherein the anode and cathode assemblies each comprise layers of catalytic material which are essentially the same size and register with one another.

5. An integral edge seal as set forth in claim 4, wherein the matrix assembly has an elastomer permeating a band generally contiguous with the peripheral edges thereof to form an edge seal which prevents the gases and electrolyte from entering said peripheral edge band.

6. An integral edge seal as set forth in claim 1, wherein the anode and cathode assemblies each comprises a sheet of backing paper overlaid with a layer of catalytic material and the backing paper and layers of catalytic material each has a peripheral edge band permeated with an elastomer and the elastomer permeated bands are generally contiguous with the peripheral edges of the backing paper and are wider than the elastomer permeated bands contiguous with the peripheral edges of the catalytic layers.

7. An integral edge seal as set forth in claim 6, wherein the matrix assembly has an elastomer disposed to permeate a band contiguous with the peripheral edges thereof to form an edge seal which prevents the electrolyte from entering said peripheral edge band.

8. An integral edge seal as set forth in claim 1, wherein the matrix assembly has an elastomer disposed to permeate a band adjacent the peripheral edges thereof to form an edge seal which prevents the electrolyte from entering said peripheral edge band.

9. An integral edge seal as set forth in claim 1, wherein the matrix assembly has an elastomer strip disposed to form a peripheral edge band encircling the matrix, said matrix peripheral edge band engaging the peripheral edge bands of the anode and cathode assemblies to form a seal adjacent the outer periphery of the fuel cell.

10. An integral edge seal as set forth in claim 1, wherein the fuel cell comprises a layer of silicon carbide disposed between the anode and cathode assemblies, the layer of silicon carbide having an elastomer permeated band disposed generally contiguous with its outer peripheral edges.

11. An integral edge seal as set forth in claim 3, wherein the fuel cell comprises a layer of silicon carbide disposed between the anode and cathode assemblies, the layer of silicon carbide having an elastomer permeated band disposed generally contiguous with its outer peripheral edges.

12. An integral edge seal as set forth in claim 11, wherein the layer of silicon carbide has wider margins than the layer of catalytic material.

13. An integral edge seal as set forth in claim 3, wherein the anode assembly comprises a layer of silicon carbide having an elastomer permeated band disposed generally contiguous with its outer peripheral edges.

14. An integral edge seal as set forth in claim 13, wherein the layer of silicon carbide has wider margins than the layer of catalytic material.

15. An integral edge seal as set forth in claim 14, wherein the elastomer permeated band disposed generally contiguous with the outer peripheral edges of the silicon carbide layer is a band of paper permeated with an elastomer.

16. An integral edge seal as set forth in claim 3, wherein the cathode assembly comprises a layer of silicon carbide having an elastomer permeated band disposed generally contiguous with the outer peripheral edges of the silicon carbide layer.

17. An integral edge seal as set forth in claim 16, wherein the layer of silicon carbide has wider margins than the layer of catalytic material.

18. An integral edge seal as set forth in claim 17, wherein the elastomer permeated band disposed generally contiguous with the outer peripheral edges of the silicon carbide layer is a band of paper permeated with an elastomer.

19. An integral edge seal as set forth in claim 1, wherein the elastomer is a copolymer of tetrafluoroethylene and propylene.

20. An integral edge seal as set forth in claim 1, wherein the elastomer is Aflas.

21. An integral edge seal as set forth in claim 10, wherein the matrix has smaller peripheral edges than the anode assembly, the cathode assembly and the silicon carbide layer and the matrix is sandwiched between the anode assembly, the cathode assembly and silicon carbide layer and the impregnated edges thereof abut and extend beyond the edges of the matrix forming an electrolyte and gas tight integral edge seal and a wet or gas seal between the anode and cathode; slight depressions formed adjacent the peripheral edges due to the smaller matrix are filled with an elastomer to complete the integral edge seal and present a smooth filled exterior surfaces between the conductive plates.

* * * * *